United States Patent
Ankarali et al.

(10) Patent No.: US 10,630,520 B2
(45) Date of Patent: *Apr. 21, 2020

(54) JOINT PHYSICAL LAYER SECURITY AND PAPR MITIGATION IN OFDM SYSTEMS

(71) Applicant: University of South Florida, Tampa, FL (US)

(72) Inventors: Zekeriyya Esat Ankarali, Tampa, FL (US); Huseyin Arsian, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,297

(22) Filed: Sep. 20, 2018

(65) Prior Publication Data

US 2019/0020519 A1    Jan. 17, 2019

Related U.S. Application Data

(63) Continuation of application No. 15/276,838, filed on Sep. 27, 2016, now Pat. No. 10,084,628, which is a (Continued)

(51) Int. Cl.
*H04L 27/26* (2006.01)
*H04W 72/04* (2009.01)
(Continued)

(52) U.S. Cl.
CPC ........... *H04L 27/2614* (2013.01); *H04B 1/40* (2013.01); *H04B 17/318* (2015.01);
(Continued)

(58) Field of Classification Search
CPC ... H04L 63/1408; H04L 27/2614; H04L 1/00; H04L 1/20; H04L 27/2618;
(Continued)

(56) References Cited

U.S. PATENT DOCUMENTS 10,084,628 B2 *  9/2018  Ankarali ............. H04L 27/2618
2006/0222097 A1  10/2006  Gupta et al.
(Continued)

OTHER PUBLICATIONS

S. Goel and R. Negi, "Guaranteeing Secrecy Using Artificial Noise," Wireless Communications, IEEE Transactions on, vol. 7, No. 6, pp. 2180-2189, 2008. Copy not Provided.
(Continued)

*Primary Examiner* — Sung S Ahn
(74) *Attorney, Agent, or Firm* — Thomas | Horstemeyer, LLP

(57) ABSTRACT

Systems and methods for securing orthogonal frequency division multiplexing (OFDM) transmission of data are discussed herein. Computing devices can sense the signal strength of frequencies on an OFDM wireless channel. The computing device can determine which of the frequencies are fading frequencies failing below a threshold. A transmitting computing device can send artificial data on the failing frequencies and genuine data on the remaining frequencies. Artificial data can be designed to mitigate peak-average-power ratio (PAPR) to have an additional benefit without using extra resource.

20 Claims, 6 Drawing Sheets

Related U.S. Application Data continuation of application No. 14/870,464, filed on Sep. 30, 2015, now Pat. No. 9,479,375.

(60) Provisional application No. 62/141,978, filed on Apr. 2, 2015.

(51) Int. Cl.
| | | |
|---|---|---|
| *H04B 1/40* | (2015.01) | |
| *H04L 1/00* | (2006.01) | |
| *H04L 1/20* | (2006.01) | |
| *H04B 17/318* | (2015.01) | |
| *H04B 17/391* | (2015.01) | |
| *H04L 27/34* | (2006.01) | |
| *H04L 5/00* | (2006.01) | |
| *H04W 52/04* | (2009.01) | |

(52) U.S. Cl.
CPC ............ *H04B 17/3911* (2015.01); *H04L 1/00* (2013.01); *H04L 1/20* (2013.01); *H04L 27/2618* (2013.01); *H04L 27/3411* (2013.01); *H04W 72/0453* (2013.01); *H04L 5/0007* (2013.01); *H04W 52/04* (2013.01)

(58) Field of Classification Search
CPC . H04L 27/3411; H04L 5/0007; H04B 17/318; H04B 17/3911; H04B 1/40; H04W 72/0453; H04W 52/04
See application file for complete search history.

(56) References Cited

U.S. PATENT DOCUMENTS

| | | |
|---|---|---|
| 2007/0211809 A1 | 9/2007 | Kim |
| 2009/0060075 A1 | 3/2009 | Mohebbi |
| 2009/0135949 A1 | 5/2009 | Yu |
| 2010/0202545 A1 | 8/2010 | Lim et al. |
| 2010/0266055 A1 | 10/2010 | Mueck et al. |
| 2013/0215996 A1 | 8/2013 | Boutros et al. |
| 2013/0235773 A1 | 9/2013 | Wang et al. |
| 2014/0213197 A1* | 7/2014 | An .......................... H04B 1/10 455/73 |

OTHER PUBLICATIONS

E. Guvenkaya and H. Arslan, "Secure Communication in Frequency Selective Channels with Fade-Avoiding Subchannel Usage," in Communications Workshops, (ICC), 2014 IEEE International Conference on. IEEE, 2014, pp. 313-818. Copy not Provided.

* cited by examiner

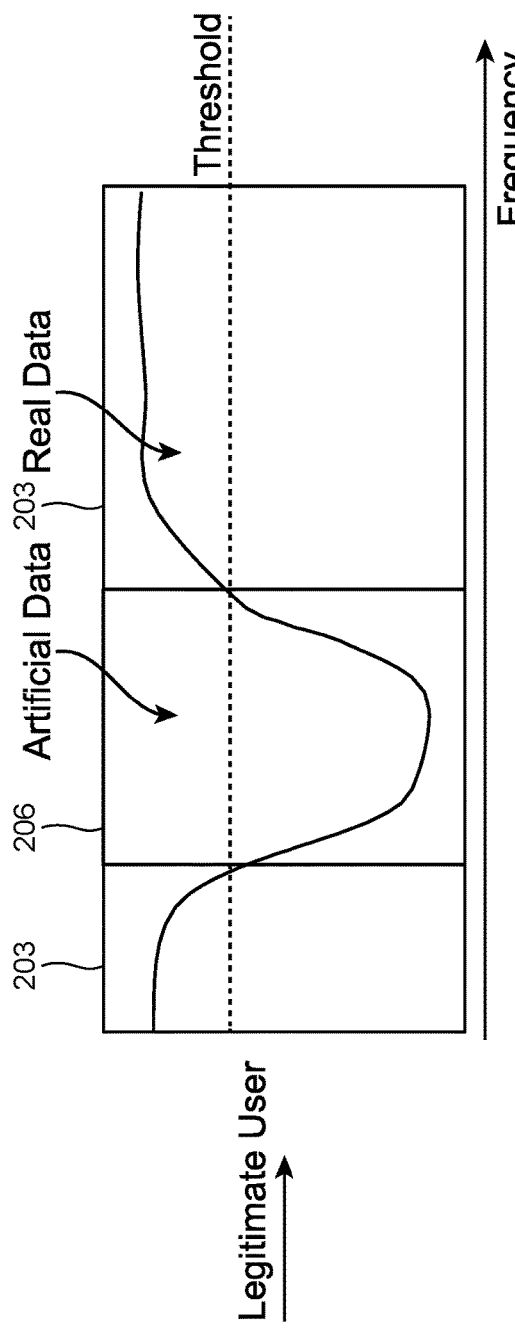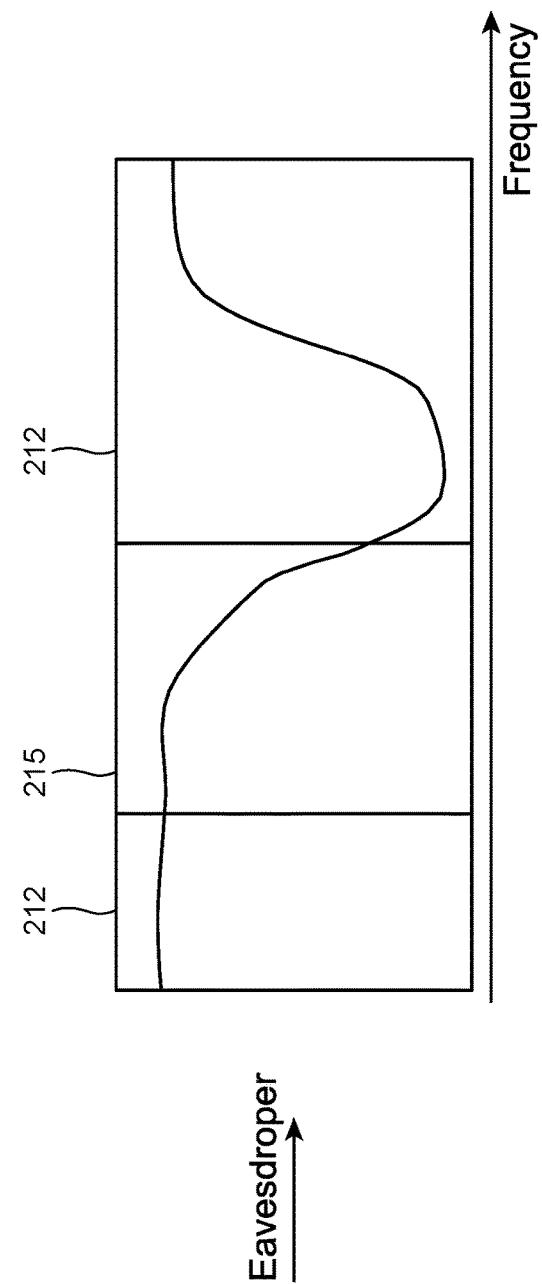

JOINT PHYSICAL LAYER SECURITY AND PAPR MITIGATION IN OFDM SYSTEMS

CROSS-REFERENCE TO RELATED APPLICATIONS

This application is a continuation of U.S. Patent Application entitled "Joint Physical Layer Security and PAPR Mitigation in OFDM Systems", having Ser. No. 15/276,838, filed Sep. 27, 2016, which is a continuation of U.S. Patent Application entitled "Joint Physical Layer Security and PAPR Mitigation in OFDM Systems", having Ser. No. 14/870,464, filed Sep. 30, 2015, and claims priority to, and the benefit of, U.S. provisional application entitled "Joint Physical Layer Security and PAPR Mitigation in OFDM Systems", having Ser. No. 62/141,978, filed Apr. 2, 2015, the contents of which are incorporated by reference in their entirety.

BACKGROUND

The broadcast nature of wireless mediums can be susceptible to threats regarding privacy and security of wireless communication. For example, an eavesdropper may be able to capture wireless signals. Depending on the type of wireless transmission, these signals can be available from a variety of distances, for example several yards, a mile, or across the globe. Data protection techniques can provide one form of security to communication. Encryption with a secret key is one method to conceal data. However, encryption techniques may not be sufficient for some scenarios, such as securely sharing a secret key with the intended nodes. Therefore, alternative means are needed to increase security. For example, physical layer security can provide enhanced security in the waveform domain. Security measures dealing with the waveform domain can prevent the extraction of the actual data properly. An eavesdropper can be prevented from extracting the actual data even if they can receive entire transmissions.

A multiple-input multiple-output (MIMO) system can have enhanced physical security by the addition of artificial noise to the actual signal. The noise signal can be designed to fall in the null space of the channel matrix between the antennas of legitimate devices using the MIMO system. Artificial noise can be eliminated while the signal is passing through the channel. Another device located in a different place has a different channel matrix than a legitimate transmitter. The artificial noise can distort the actual signal. The distortion of the actual signal can increase security. In a single-input single-output system (SISO) for single carrier-frequency domain equalization (SC-FDE) waveforms, artificial noise can be added to fading frequencies. For example, the artificial noise can be added to the fading frequencies instead of adding artificial noise to the null space. Fading frequency information can only be determined by legitimate transmitters. For example, an eavesdropper cannot separate the actual signal and artificial noise. As such, an eavesdropper can experience a significant error. However, unlike SC-FDE, where data symbols are carried in the time domain, OFDM systems carry data symbols in the frequency domain. Therefore, introducing a noise signal to an OFDM signal might not prevent eavesdroppers from detecting which frequencies are utilized and ignoring transmissions on those frequencies since noise has a different characteristic compared to the data.

In wireless communication systems, orthogonal frequency division multiplexing (OFDM) can provide numerous advantages, for example OFDM can transmit data with high bandwidth efficiency, OFDM can be implemented with fast Fourier transformation (FFT), and OFDM can be equalized simply by exploiting the advantage of cyclic prefix (CP). On the other hand, OFDM signals can suffer from high peak to average power ratio (PAPR) caused by the parallel transmission because of the non-linear characteristics of power amplifiers. An OFDM signal can be nonlinearly scaled, and in-band interference can occur at the transmitter.

DESCRIPTION OF THE DRAWINGS

For a more complete understanding of the embodiments and the advantages thereof, reference is now made to the following description, in conjunction with the accompanying figures briefly described as follows:

FIGS. 2A and 2B illustrate frequency regions of data as seen by various receivers and transmitters according to various example embodiments;

Figure 1:
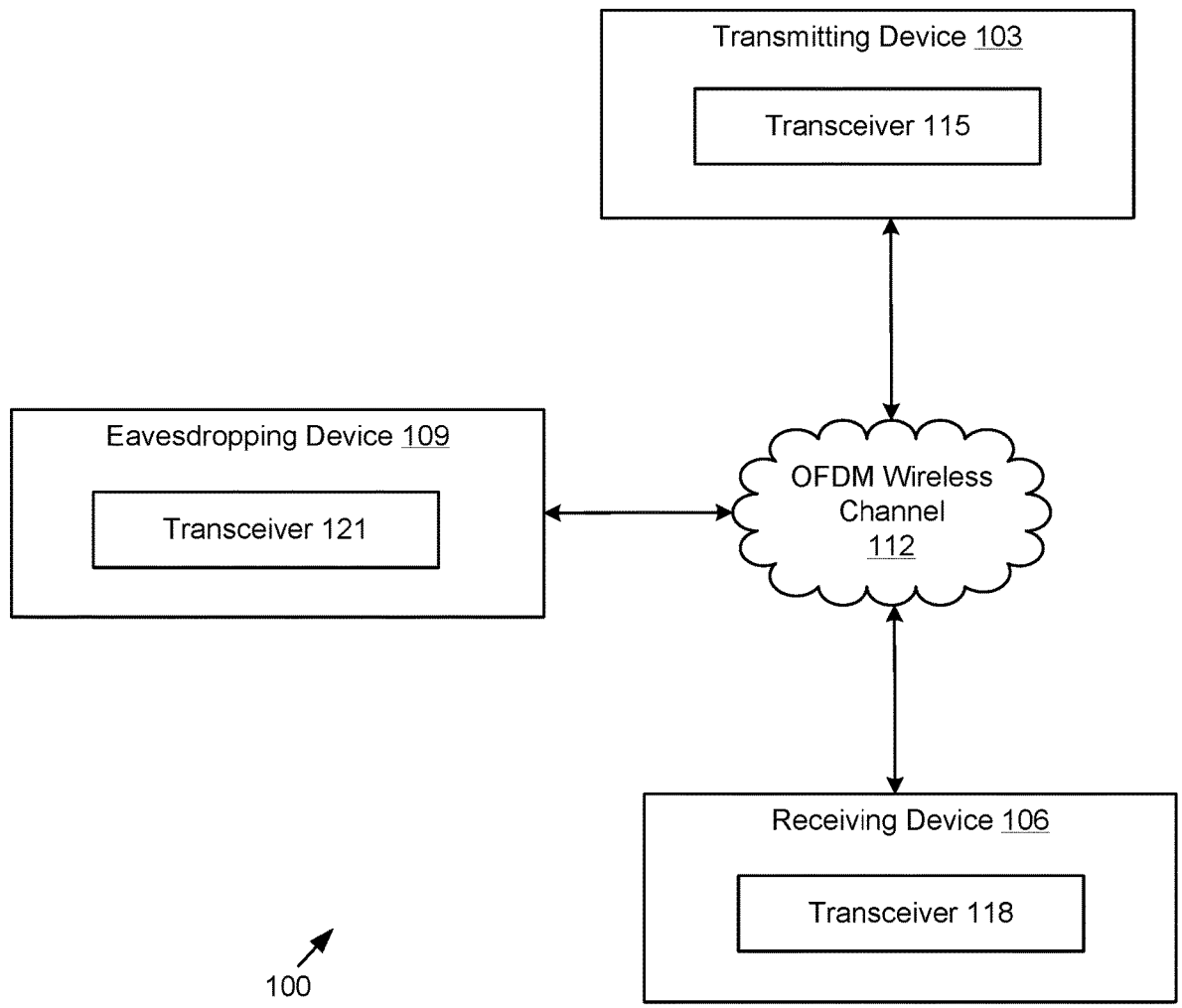
FIG. 1 is a drawing of a networked environment according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Discussed herein is a technique for securing OFDM signals. In addition, the technique can also be enhanced to mitigate PAPR. The reduction of PAPR can be accomplished without sacrificing additional spectral bandwidth. In contrast to introducing artificial noise, artificial data can be inserted into modulated symbols since an eavesdropping device may be able to determine the frequency location utilized as artificial noise. By inserting artificial data into modulated symbols, an eavesdropping device can be prevented from detecting artificial data frequencies.

In addition, the artificial data can be chosen to mitigate PAPR. By choosing PAPR mitigating artificial data, the PAPR can be reduced without consuming resources beyond those utilized for security. The artificial data can be selected based on the data to be transmitted. The data signal can include genuine data that corresponds to the frequencies that meet the channel gain threshold. In one example, the genuine data is information to be transmitted from the transmitting device to the receiving device.

The system can include an OFDM wireless channel that is between a pair of wireless transceivers. The wireless channel can include a plurality of frequencies bands. For example, in OFDM multiple orthogonal frequencies are used. A wireless transceiver can communicate over the OFDM wireless channel to another wireless transceiver. Each of the wireless transceivers can be configured to sense the signal strength or channel gain of each frequency on the OFDM wireless channel. The transceivers can also be configured to determine which of the frequencies meet a threshold, and this determination can be based on the signal strength of each of the frequencies.

While the threshold can be predefined, in some embodiments, the threshold can be set by a user of the system, and in other embodiments, the threshold can be negotiated between two devices. The threshold can be based on the amount of data to be transmitted and/or the sensitivity of the data. For example, if a transceiver is to transmit a short and very important data packet, the threshold can be higher.

The transmitting transceiver can be configured to generate artificial data that reduces the PAPR of the resulting transmission. The transceiver can also initiate transmission of the resulting data signal. The resulting data signal can include the artificial data corresponding to frequencies that are determined not to meet the threshold. The resulting data signal can include genuine data being mapped to frequencies that are determined to meet the threshold.

With reference to FIG. 1, shown is a networked environment 100 according to various embodiments. The networked environment includes a transmitting device 103, a receiving device 106, one or more eavesdropping device 109, and an OFDM wireless channel 112. The transmitting device 103, the receiving device 106, and the eavesdropping device 109 can include one or more transceiver 115, 118, and 121, respectively. Each of the transceivers 115, 118, and 121 can transmit and receive a wireless OFDM signal on the OFDM wireless channel 112.

The wireless OFDM channel 112 can have unique characteristics between any two of the transceivers 115, 118, and 121. The unique characteristics can be based on the location of each of the transceivers 115, 118, and 121. As an example, the wireless OFDM channel 112 between the transceiver 115 and the transceiver 118 has different characteristics in comparison to the wireless OFDM channel 112 between transceiver 115 and transceiver 121 or between transceiver 118 and transceiver 121.

In OFDM, a block of N complex valued QAM symbols, for example $X=[X_0, X_1, \ldots, X_{N-1}]$, can be mapped onto N subcarriers with the IFFT operation. The resulting signal can give the elements in a time domain representation, $x=[x_0, x_1, \ldots, x_{N-1}]$. In one embodiment, a sample of this signal can be written as:

$$x_m = \frac{1}{N} \sum_{k=0}^{N-1} X_k \, e^{j2\pi km/N}. \tag{1}$$

After passing through the wireless channel, such as OFDM wireless channel 112, each subcarrier can be multiplied by the channel gain of the corresponding frequency, and received signal in frequency domain can be given as $$Y_k = H_k X_k, \tag{2}$$

where $Y_k$ is the received symbol and $H_k$ is the channel gain at the frequency of kth subcarrier. The channel gain on the OFDM wireless channel 112 at a frequency can be dependent on the location of the communicating devices. For example, the channel gain at a frequency can be based on the location of the transmitting device 103, the receiving device 106, and the medium between the transmitting device 103 and the receiving device 106. As the location of the transmitting device 103 or receiving device 106 changes, the OFDM wireless channel 112 between them can also change.

In addition, the OFDM wireless channel 112 between two communicating transceivers is reciprocal. According to one example, the characteristics of the OFDM wireless channel 112 between the transceiver 115 and the transceivers 118 have the same characteristics when viewed from either transceiver 115 or 118. Both the transceiver 115 and the transceiver 118 can experience the same OFDM wireless channel 112 throughout the coherence time of the medium. Further, transceiver 121 cannot experience the same OFDM wireless channel 112 throughout the coherence time of the medium between the transceivers 115 and 118.

In an SC-FDE system, artificial noise can be inserted on fading frequencies. Fading frequencies can be one or more frequency and/or one or more bands of frequencies. The fading frequencies can be identified as having low channel gains. The fading frequencies can also be identified as causing large power losses as compared to other frequencies. Information regarding which frequencies can be faded on any given channel will only be available to the receiver and transmitter sharing the channel. An eavesdropping device cannot separate the actual signal and artificial noise. Therefore, the data carrying signal from the eavesdropping device can be distorted with the artificial noise. Meanwhile, the transmitting device and receiving device can agree to ignore artificial signal noise because of the channel reciprocity.

However, unlike in the SC-FDE system, where data symbols are carried in the time domain, OFDM systems carry data symbols in the frequency domain. Therefore, introducing a noise signal to an OFDM signal may not prevent eavesdroppers from detecting which frequencies are utilized and ignoring transmissions on those frequencies. However, inserting artificial data as opposed to artificial noise can solve this deficiency of artificial noise. For example, if a QPSK modulation is utilized, the transmitting device 103 can select symbols from four complex numbers. If a particular region of a signal is filled with arbitrary samples while the remaining part can be filled with QPSK symbols, the eavesdropping device 109 may be able to understand artificial noise carrying frequencies through observation. However, the transmitting device 103 can choose irrelevant QPSK symbols rather than artificial noise, which is referred to herein as artificial data insertion. Further, the transmitting device 103 can select the artificial data to reduce PAPR. In fact, a large PAPR can correspond to a large variance in the signal, which can be one of the major drawbacks in OFDM systems.

As PAPR increases for an OFDM signal over OFDM wireless channel 112, a power amplifier can output outside of its linear range, which can cause signal distortion. This distortion can degrade communication performance. This can be prevented by reducing the PAPR of a signal. Alternatively, this can be mitigated by utilizing a more expensive power amplifier having a larger dynamic range in transceivers 115 and 118. When artificial data is added to the fading frequencies on a channel on OFDM wireless channel 112 for security, the transmitting device 103 can choose the artificial data to reduce PAPR to mitigate PAPR problems without additional cost. For example, the transmitting device 103 can reduce the the PAPR without utilizing additional bandwidth on the OFDM wireless channel 112 beyond the fading frequencies utilized for security.

By doing this, the transmitting device 103 can reduce PAPR and secure the communication to the receiving device 106 over OFDM wireless channel 112 without consuming any extra resources. As a non-limiting example, the artificial data inserted OFDM signal in time domain can be expressed in equation 3 as follows:

$$\hat{x}_m = \frac{1}{N} \sum_{k=0}^{N-1} (a_k X_k + b_k \tilde{X}_k) e^{j2\pi km/N} \quad (3)$$

where $\tilde{X}_k$ is the artificial data samples in frequency, $a_k$ is 1 when k is the index of an information data, otherwise it is 0 and $b_k$ is 1 when k is the index of an artificial data, otherwise it is 0. Then we can form our objective function as, $$\tilde{X}_k = \arg\min_{\tilde{X}_k} \|\hat{x}\|_\infty \quad (4)$$

$$\text{subject to } \tilde{X}_k \in \Gamma \quad (5)$$

where $\|\hat{x}\|\infty$ represents the infinite norm operation and $\Gamma$ is the set of modulation symbols, e.g., $\{e^{j\pi/4}, e^{j3\pi/4}, e^{-j3\pi/4}, e^{-j\pi/4}\}$ for QPSK type of modulation.

In this way, transmitting device 103 can reduce the PAPR and secure the OFDM wireless channel 112 to prevent attacks by the eavesdropping device 109. For example, the transmitting device 103 can prevent the eavesdropping device 109 from determining the genuine data because the eavesdropping device 109 cannot determine which frequencies are carrying the artificial data.

According to one embodiment, the transmitting device 103 and a receiving device 106 are identical devices. The receiving device 106 transmits data over the OFDM wireless channel 112 to the transmitting device using the security and PAPR reduction techniques discussed herein. For example, the receiving device 106 can transmit artificial data chosen to reduce PAPR in frequencies that fail to meet a threshold and transmit genuine data in the remaining frequencies. The transmitting device 103 receives the wireless transmission over the OFDM wireless channel 112 from the receiving device 106 using the techniques discussed herein. For example, the transmitting device 103 determines which frequencies fail to meet the threshold and discard data on those frequencies.

With reference to FIG. 2A, shown is an illustration of the fading frequencies of the OFDM wireless channel 112 as seen by the transceivers 115 and 118 according to various embodiments. The OFDM wireless channel 112 as seen by transceivers 115 and 118 includes genuine data frequencies 203 and artificial data frequencies 206. The transmitting device 103 and the receiving device 106 can sense the frequencies having signal characteristics, such as signal strength, that fails to meet the threshold.

The transmitting device 103 and the receiving device 106 sense the strength of the signal using transceivers 115 and 118. The transmitting device 103 and the receiving device 106 can identify those frequencies as artificial data frequencies. In communications, the transmitting device 103 and the receiving device 106 can use the frequencies meeting the threshold signal strength to carry genuine data and use the frequencies failing to meet the threshold signal strength to carry artificial data.

With reference to FIG. 2B, shown is an illustration of the fading frequencies of the OFDM wireless channel 112 as seen by the transceiver 121 according to various embodiments. The eavesdropping device 109 can receive the OFDM wireless data transmitted by either transmitting device 103 or receiving device 106. However, the eavesdropping device 109 experiences different fading frequencies as compared to the transmitting device 103 and the receiving device 106 when receiving the OFDM wireless data. The OFDM wireless channel 112 as seen by transceivers 121 and 118 cannot differentiate between genuine data frequencies 212 and artificial data frequencies 215.

Figure 3:
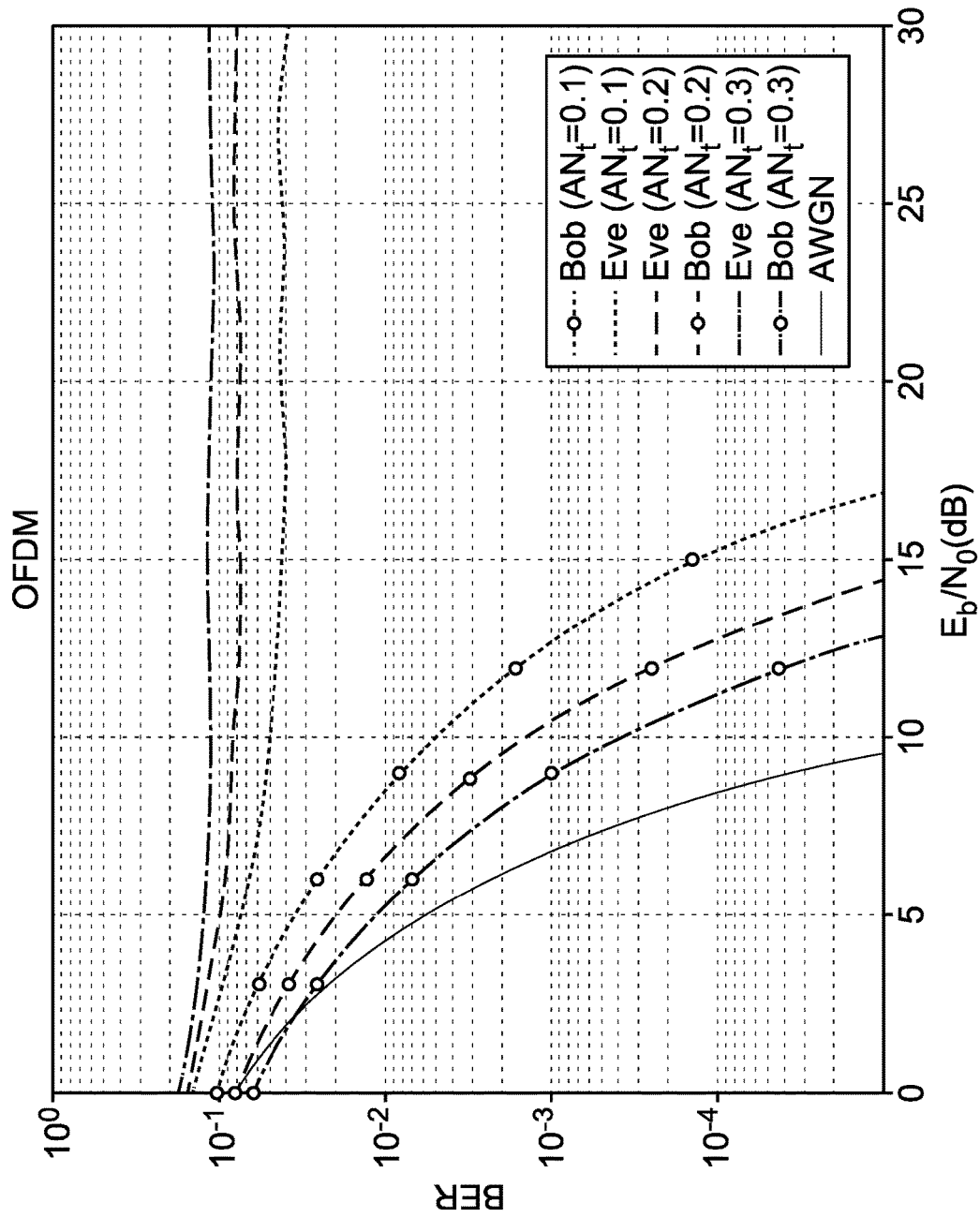
FIG. 3 illustrates bit-error rates for various receivers and transmitters according to various example embodiments.
Figure 4:
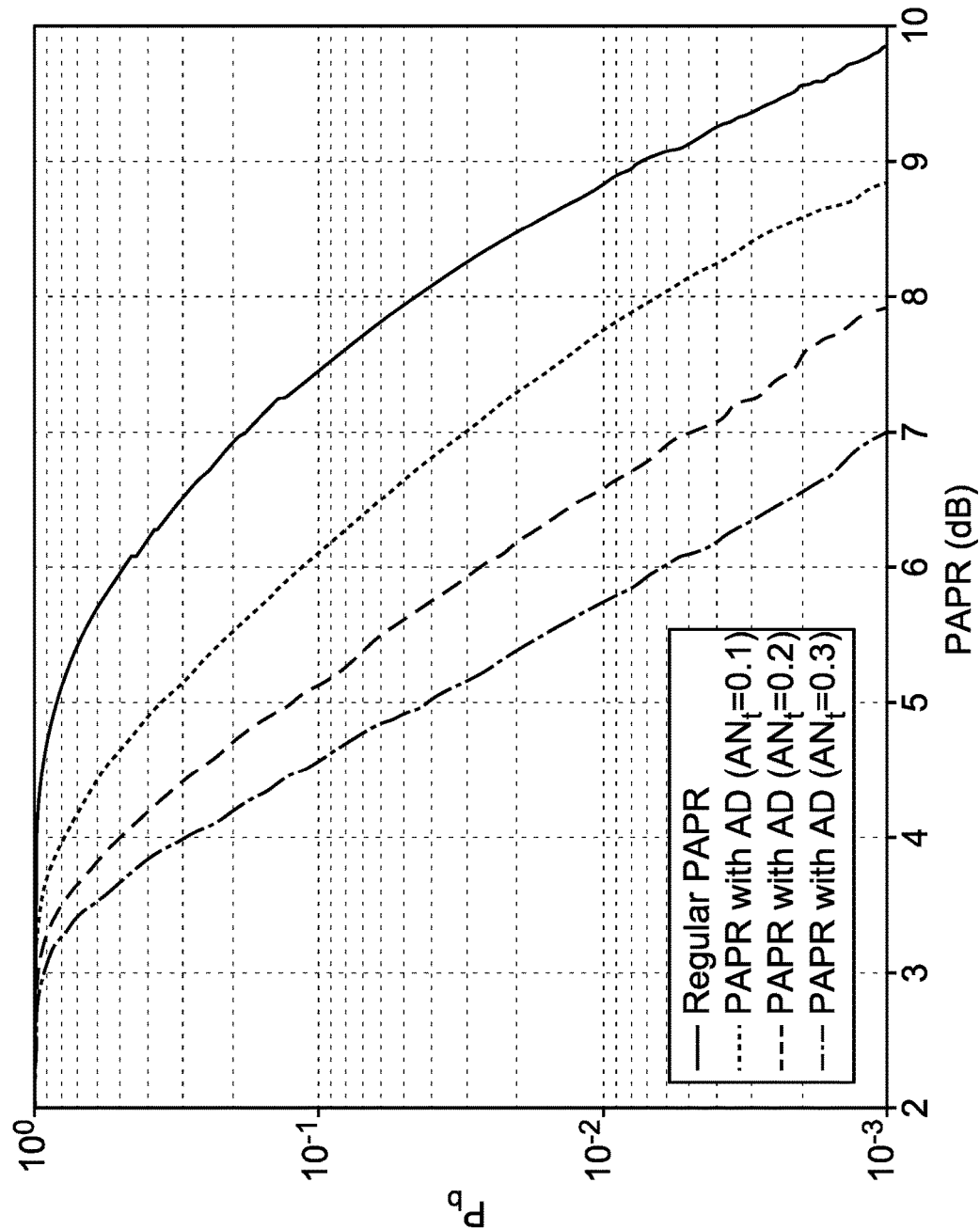
FIG. 4 illustrates PAPR reduction performance according to various example embodiments.

FIGS. 3 and 4 illustrate measured results according to an example embodiment. In this example embodiment, the multiple parameters can be determined. For example, QPSK can be utilized for modulation, a number of subcarriers can be determined as 32, a 16-tap Rayleigh channel can be used for having the required selectivity in frequency, the average channel power can be normalized to 1, and one of three different threshold values, 0.1, 0.2, and 0.3, can be chosen in order to select artificial data insertion frequencies. According to one example, the thresholds of 0.1, 0.2, and 0.3 correspond to utilizing of 9%, 18%, or 26% respectively for spectral resource for artificial data based on the performed simulations.

FIG. 3 illustrates a bit error rate for a variety of users and thresholds according to the example embodiment. Bit-error-rate (BER) results for a legitimate user using receiving device 106, Bob, and an eavesdropper using eavesdropping device 109, Eve, are shown in FIG. 3. The receiving device 106 has a lower error probability rate than standard communications because the fading frequencies are used for artificial data insertion. This is because the majority of bit errors that occur in OFDM can be within data transmitted over the fading frequencies. In contrast in FIG. 3, the eavesdropping device 109 has a large BER even for high signal-to-noise ratio (SNR) values. For example, the BER does not noticeably reduce as Eb/No (dB) increases for the signal sensed by the eavesdropping device 109 at any threshold level. In addition, the transmitting device 103 can use a larger threshold can degrade BER performance of the eavesdropping device 109 while enhancing BER performance of the receiving device 106 at the expense of more spectral resource usage.

FIG. 4 illustrates PAPR values for legitimate user Bob using receiving device 106 and Eve on eavesdropping device 109 at various threshold values according to the example embodiment. The additional data can be selected to optimize PAPR. Shown are the PAPR curves for the aforementioned threshold values. The transmitting device 103 can use a flipping algorithm to find a sub-optimum artificial data set that reduces PAPR. The complexity of this technique can be expressed as proportional to M×K where M is the number of modulation symbols and K is the number of subcarriers used for artificial data in one symbol. As shown in FIG. 4, as the threshold increases, the PAPR reduces. In addition, utilizing a flipping algorithm may not add significant complexity because a flipping algorithm for such optimization problems can be implemented with low complexity. In other embodiments, more complex algorithms can be selected by the transmitting device 103 to obtain better PAPR reduction performance.

Figure 5A:
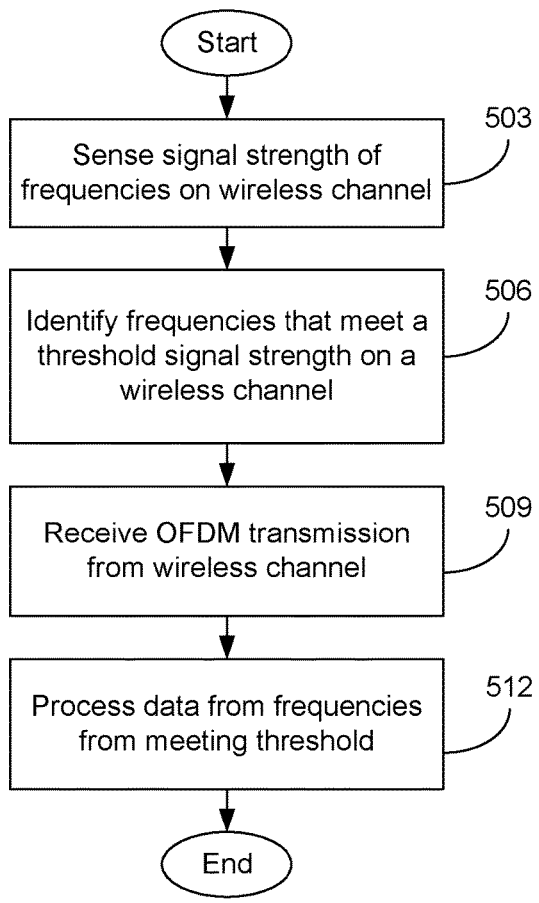
FIGS. 5A and 5B are flow charts illustrating one example of functionality implemented on a transmitting transceiver and a receiving transceiver according to various embodiments.

Referring next to FIG. 5A, shown is a flowchart that provide examples of the operation of a receiving device 106 (FIG. 1) according to various embodiments. It is understood that the flowchart of FIG. 5A provides merely an example of the many different types of functional arrangements that can be employed to implement the operation of the portion of the receiving device 106 as described herein. As an alternative, the flowchart of FIG. 5A can be viewed as depicting examples of steps of a method implemented in a receiving device 106 according to one or more embodiments.

The process in FIG. 5A can be used to receive data with security in the physical layer and a reduced PAPR on the transmitted signal according to one or more embodiments. In step 503, the process involves sensing the signal strength of each of one or more frequencies on a wireless channel. For example, a transceiver 118 (FIG. 1) can be configured to communicate utilizing closely spaced orthogonal sub-carrier signals on parallel data frequencies. The transceiver 118 can be configured to sense the signal strength on each of the frequencies.

In step 506, the process involves identifying frequencies that meet a threshold signal strength on the wireless channel. In some embodiments, the process can involve identifying fading frequencies that fail to meet the threshold signal strength. For example, the receiving device 106 can compare the signal strengths measured in 506 to a threshold frequency. The receiving device 106 can identify the frequencies that meet the threshold as frequencies to use to receive genuine data. The receiving device 106 can identify the frequencies that fail to meet the threshold as frequencies to use for artificial data.

In step 509, the process involves receiving an OFDM transmission from the wireless channel. For example, the transceiver 118 can listen on the OFDM wireless channel 112 for a transmission and record the transmission upon receipt. In step 512, the process involves processing data from frequencies that meet the threshold. The receiving device 106 can identify data from frequencies that fail to meet the threshold as artificial data and processing data from the frequencies that meet the threshold. The receiving device 106 can discard data received on the frequencies failing to meet the threshold.

Figure 5B:
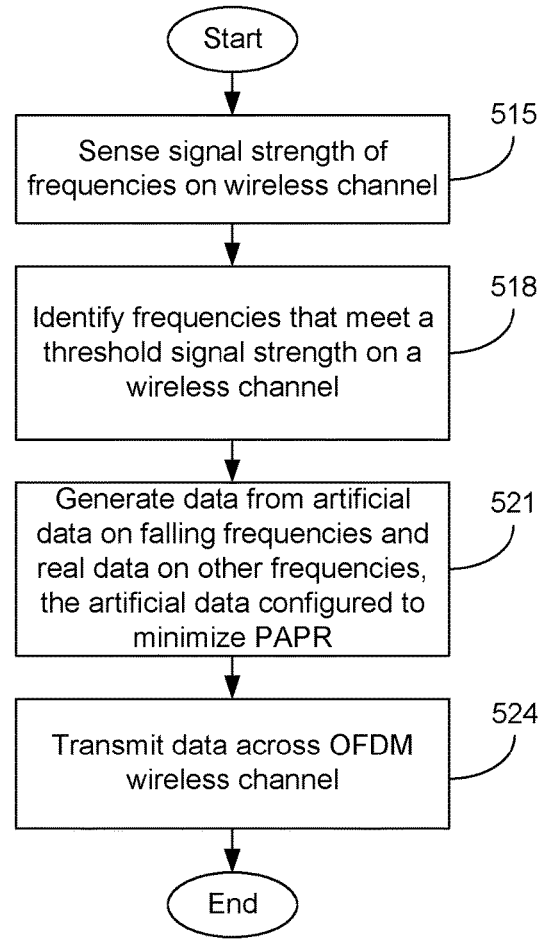

Referring next to FIG. 5B, shown is a flowchart that provide an example of the operation of a transmitting device 103 (FIG. 1) according to various embodiments. It is understood that the flowchart of FIG. 5B provides merely an example of the many different types of functional arrangements that can be employed to implement the operation of the portion of the transmitting device 103 as described herein. As an alternative, the flowchart of FIG. 5B can be viewed as depicting examples of steps of a method implemented in a transmitting device 103 according to one or more embodiments.

The process in FIG. 5B can be used to transmit data with security in the physical layer and a reduced PAPR on the transmitted signal according to one or more embodiments. In step 515, the process can involve sensing the signal strength of each of one or more frequencies on a wireless channel. For example, a transceiver 115 (FIG. 1) of the transmitting device 103 can be configured to communicate utilizing closely spaced orthogonal sub-carrier signals on parallel data frequencies. The transceiver 115 can be configured to sense the signal strength on each of the frequencies.

In step 518, the process involves identifying frequencies that meet a threshold signal strength on the wireless channel. The transmitting device 103 can identify fading frequencies that fail to meet the threshold signal strength on the OFDM wireless channel 112. For example, the transmitting device 103 can compare the signal strengths measured in 515 to a threshold frequency. The transmitting device 103 can identify the frequencies that meet the threshold as frequencies to use to transmit genuine data. The transmitting device 103 can identify the frequencies that fail to meet the threshold as frequencies to use for artificial data.

In step 521, the process can involve generating a signal including artificial data on frequencies that fail to meet the threshold and genuine data on frequencies that meet the threshold requirement. The process can also involve generating the artificial data as data that minimized the PAPR of the generated signal. For example, the transmitting device 103 can determine artificial data that will lower a PAPR value of a resulting signal when substituted for genuine data. The transmitting device 103 can also place artificial data into bandwidth frequencies that, based on various real world factors, require greater power to or that have reduced quality or intensity at a corresponding receiving device 106. As an example, the various real world factors can include the medium between the transmitting device 103 and the receiving device 106 and the distance between the transmitting device 103 and the receiving device 106.

In step 524, the process can involve transmitting the resulting signal over the OFDM wireless channel. For example, the transmitting device 103 can transmit the signal over the OFDM wireless channel 112. The transmitting device 103 can utilize the transceiver 115 to transmit the signal to a receiving device 106.

Figure 6:
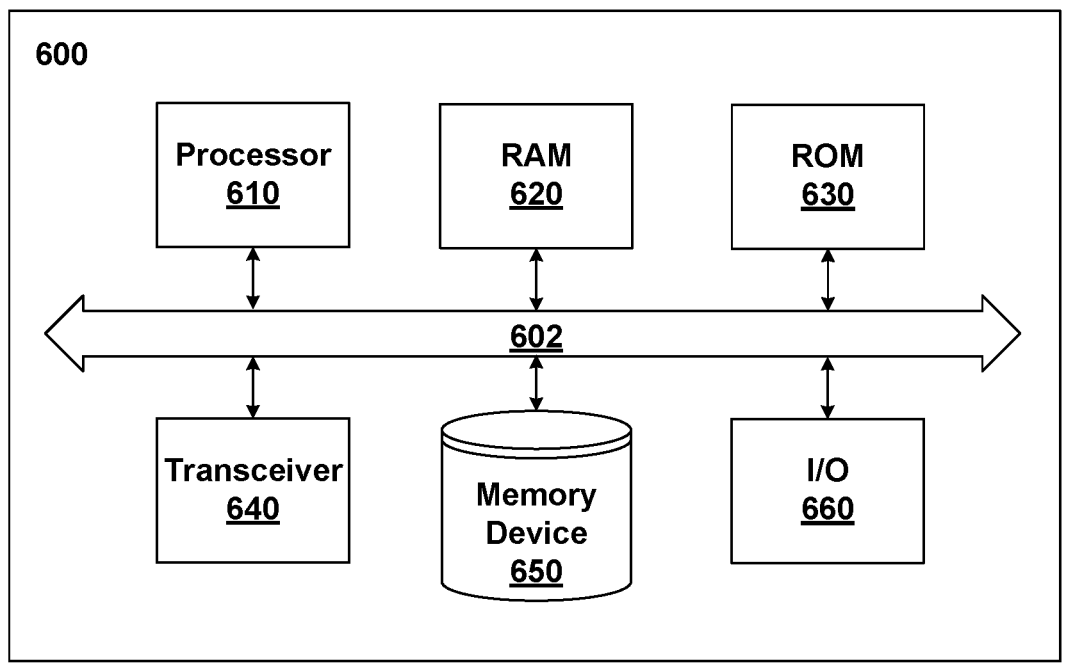
FIG. 6 illustrates an example schematic block diagram of a computing environment which can embody one or more of the system according to various embodiments.

FIG. 6 illustrates an example schematic block diagram of a computing architecture 600 that may be employed as either of the transceivers according to various embodiments described herein. The computing architecture 600 may be embodied, in part, using one or more elements of a specific purpose processing circuit or computing device. The computing architecture 600 includes a processor 610, a random access memory (RAM) 620, a Read Only Memory (ROM) 630, a transceiver 640, a memory device 650, and an Input Output (I/O) interface 660. The elements of computing architecture 600 are communicatively coupled via one or more local interfaces 602. The elements of the computing architecture 600 are not intended to be limiting in nature, as the architecture may omit elements or include additional or alternative elements.

In various embodiments, the processor 610 may include or be embodied as a general purpose arithmetic processor, a state machine, or an ASIC, for example. The processor 610 may include one or more circuits, one or more microprocessors, ASICs, dedicated hardware, or any combination thereof. In certain aspects and embodiments, the processor 610 is configured to execute one or more software modules which may be stored, for example, on the memory device 650.

The RAM and ROM 620 and 630 may include or be embodied as any random access and read only memory devices that store computer-readable instructions to be executed by the processor 610. The memory device 650 stores computer-readable instructions thereon that, when executed by the processor 610, direct the processor 610 to execute various aspects of the embodiments described herein.

As a non-limiting example group, the memory device 650 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 660 includes device input and output interfaces, such as keyboard, pointing device, display, communication, and/or other interfaces. The one or more local interfaces 602 electrically and communicatively couples the processor 610, the RAM 620, the ROM 630, the memory device 650, and the I/O interface 660 so that data and instructions may be communicated among them.

In certain aspects, the processor 610 is configured to retrieve computer-readable instructions and data stored on the memory device 650, the RAM 620, the ROM 630, and/or other storage means and copy the computer-readable instructions to the RAM 620 or the ROM 630 for execution, for example. The processor 610 is further configured to execute the computer-readable instructions to implement various aspects and features of the embodiments described herein. In embodiments where the processor 610 includes a state machine or ASIC, the processor 610 may include internal memory and registers for maintenance of data being processed.

The transceiver 640 can be any one of transceiver 115, 118, or 121 (FIG. 1). The transceiver 640 can transmit and receive data wirelessly on various frequencies. The transceiver 640 can also be configured to sense the signal strength on each frequency of a wireless channel. The transceiver 640 can communicate utilizing wireless LAN radio interfaces; digital radio system, such as DAB/EUREKA 147, DAB+, Digital Radio Mondiale, HD Radio, T-DMB, and ISDB-TSB; terrestrial digital TV systems, such as DVB-T and ISDB-T, terrestrial mobile TV systems, such as DVB-H, T-DMB, ISDB-T, and MediaFLO forward link; cellular system, such as 3G, 4G, LTE, BWA, MBWA, and E-UTRA; and other wireless frequencies.

Therefore, the following is claimed:

1. A system comprising:
   a memory device; and
   at least one computing device in communication with the memory device, the at least one computing device being configured to at least:
   sense a respective signal strength for each of a plurality of frequencies of an orthogonal frequency division multiplexing (OFDM) wireless channel;
   determine a first set of the plurality of frequencies that meet a threshold signal strength and a second set of the plurality of frequencies that fail to meet the threshold signal strength based at least in part on the respective signal strength; and
   initiate a transmission of a data signal comprising a plurality of artificial data corresponding to the second set of the plurality of frequencies.

2. The system of claim 1, wherein the data signal further comprises a plurality of genuine data corresponding to the first set of the plurality of frequencies.

3. The system of claim 1, wherein the plurality of artificial data is generated to minimize a peak to average power ratio (PAPR) across the OFDM wireless channel.

4. The system of claim 1, wherein the threshold is predefined.

5. The system of claim 1, further comprising another at least one computing device, the other at least one computing device being configured to:
   sense the respective signal strength for each of the plurality of frequencies of an OFDM wireless channel;
   determine the first set of the plurality of frequencies that meet the threshold signal strength and the second set of the plurality of frequencies that fail to meet the threshold signal strength based at least in part on the respective signal strength; and
   receive the data signal and determine a plurality of genuine data based on the first set of the plurality of frequencies.

6. The system of claim 5, wherein the threshold is negotiated between the at least one computing device and the other at least one computing device.

7. A system comprising:
   a memory device;
   a remote device;
   a second remote device; and
   at least one computing device in communication with the memory device, the at least one computing device being configured to at least:
   sense a respective signal strength associated with each of a plurality of frequencies of an orthogonal frequency division multiplexing (OFDM) wireless channel, wherein the respective signal strength associated with each of the plurality of frequencies utilized by the OFDM wireless channel is unique to the OFDM wireless channel between the at least one computing device and the remote device, wherein a respective second signal strength associated with each of the plurality of frequencies utilized by a second OFDM wireless channel between the at least one computing device and the second remote device differs from the respective signal strength associated with each of the plurality of frequencies utilized by the OFDM wireless channel;
   identify a subset of the plurality of frequencies meeting a threshold signal strength based at least in part on the respective signal strength of each of the plurality of frequencies;
   receive a wireless signal on the OFDM wireless channel; and
   determine a plurality of data from the wireless signal.

8. The system of claim 7, wherein the at least one computing device is further configured to at least extract the plurality of data from a plurality of modulated symbols.

9. The system of claim 7, wherein the OFDM wireless channel is between the at least one computing device and a remote device, and the wireless signal received is from the remote device.

10. The system of claim 7, wherein the plurality of data corresponds to the subset of the plurality of frequencies meeting the threshold signal strength.

11. A method comprising:
   sensing, via at least one computing device, a respective signal strength associated with each of a plurality of frequencies utilized by an orthogonal frequency division multiplexing (OFDM) wireless channel;
   identifying a subset of the plurality of frequencies failing to meet a threshold signal strength;
   generating a plurality of artificial data; and
   transmitting, via the at least one computing device, a signal comprising the plurality of artificial data on the subset of the plurality of frequencies.

12. The method of claim 11, wherein the respective signal strengths on the OFDM wireless channel are exclusively sensible by the at least one computing device and a remote device.

13. The method of claim 11, further comprising:
sensing, via at least one second computing device, the respective signal strength associated with each of the plurality of frequencies utilized by an OFDM wireless channel;
identifying a second subset of the plurality of frequencies that meet the threshold signal strength;
receiving, via the at least one second computing device, the signal on the OFDM wireless channel; and
determining a plurality of data from the signal, the plurality of data comprising a plurality of genuine data and the plurality of artificial data.

14. The method of claim 11, wherein the signal further comprises a plurality of genuine data on a remainder of frequencies of the plurality of frequencies.

15. The method of claim 14, wherein the method further comprises generating the signal by inserting the subset of the plurality of frequencies and the plurality of genuine data into a plurality of modulated symbols.

16. The method of claim 11, wherein the plurality of artificial data is generated to minimize a peak to average power ratio (PAPR) of the OFDM wireless channel.

17. The method of claim 16, wherein the PAPR is minimized using a flipping algorithm.

18. The method of claim 11, wherein the subset of the plurality of frequencies is identified based at least in part on the respective signal strength of each of the plurality of frequencies.

19. The system of claim 7, wherein the plurality of data comprises a plurality of artificial data.

20. The system of claim 19, wherein the plurality of data further comprises a plurality of genuine data.

\* \* \* \* \*